June 18, 1929.  F. KOENIGKRAMER  1,717,568
HEAD REST APPARATUS
Filed March 15, 1926
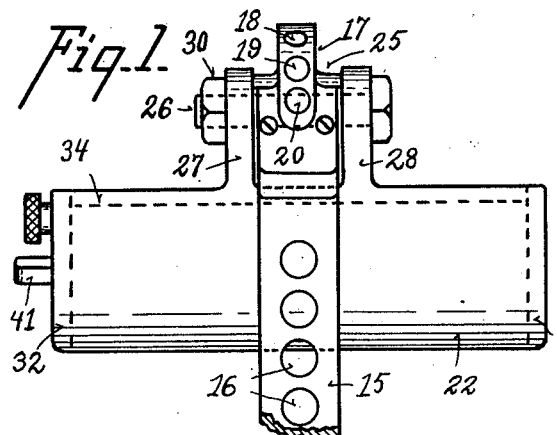
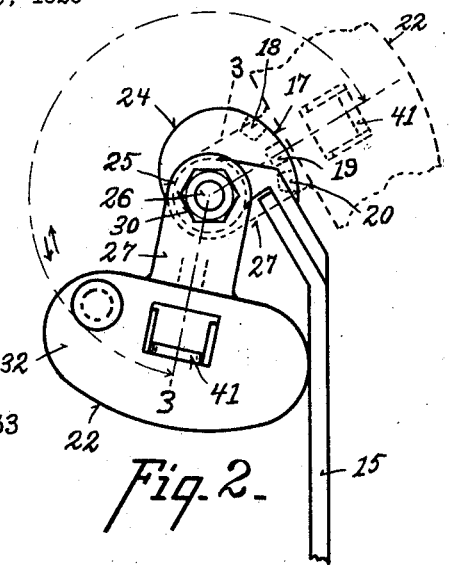
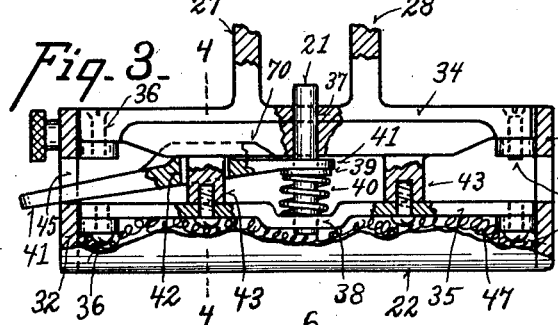
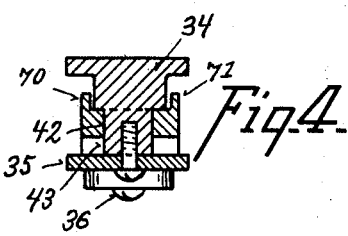
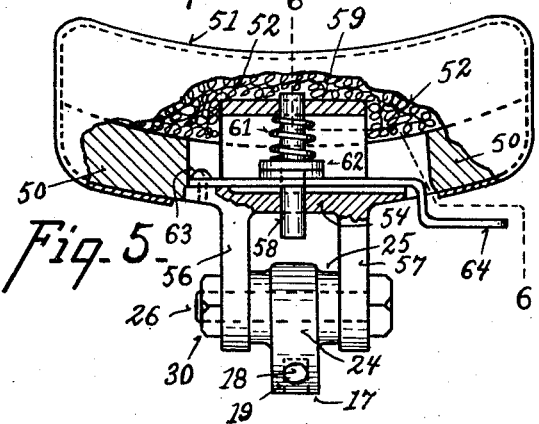
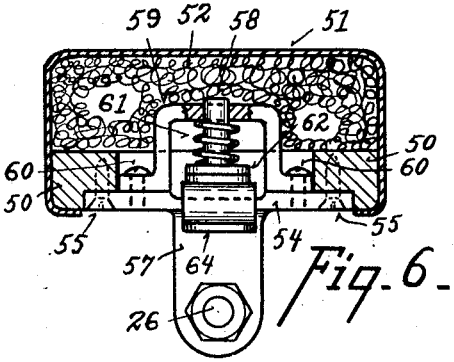
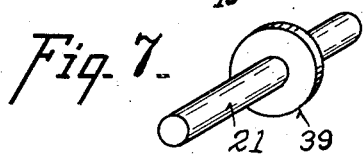
Inventor,
Frank Koenigkramer,
By C. W. Miles
Attorney.

Patented June 18, 1929.

1,717,568

UNITED STATES PATENT OFFICE.

FRANK KOENIGKRAMER, OF CINCINNATI, OHIO.

HEAD REST APPARATUS.

Application filed March 15, 1926. Serial No. 94,892.

My invention relates to improvements in head-rest apparatus. One of its objects is to provide an improved head-rest apparatus adapted to be applied to barber chairs and for similar purposes. Another object is to provide an improved head-rest apparatus adapted to be operated or adjusted by an operator using one hand, to shift the head-rest from idle to operative position, from one operative position to another, or from operative to idle position. Another object is to provide a cam arranged to engage the latch bar to assist in the adjustment of the head-rest. Another object is to provide a more simple, reliable, and readily adjustable head-rest apparatus. My invention also comprises certain details of form and arrangement, and combination of components, all of which will be fully set forth in the description of the accompanying drawings, in which Fig. 1 is a front elevation of a head-rest apparatus embodying my invention, the head-rest being shown in its idle position.

Fig. 2 is a side elevation of the head-rest apparatus shown in Fig. 1.

Fig. 3 is a detail partly in section on line 3—3 of Fig. 2.

Fig. 4 is a sectional detail taken on line 4—4 of Fig. 3.

Fig. 5 is plane view, partly in central section, of a head-rest apparatus showing a modification of the head-rest shown in Figs. 1 and 2.

Fig. 6 is a sectional view taken on line 6—6 of Fig. 5.

Fig. 7 is a perspective view of the latch bar of Figs. 1, 2 and 3 detached.

The accompanying drawings illustrate the preferred embodiments of my invention in Figs. 1, 2, 3 and 4, of which 15 represents a supporting shank by means of which the head rest is adapted to be detachably and adjustably supported with reference to a chair back, not shown. The shank 15 may be provided with rack teeth or with perforations 16, or similar means by which the shank 15 may be latched to different heights or positions of adjustment with reference to a chair back. At the upper end of the shank 15 is rigidly mounted thereon a segment 17 provided in its periphery with a series of perforations 18, 19 and 20, to be engaged by a resiliently actuated latch bar 21 carried by the head-rest 22. The segments 17 is provided with a cam face 24 over which the end of the latch bar 21 is adapted to ride as the head-rest is rotatably adjusted to retract the latch bar preparatory to entry of the latch bar into the forward recess 18 of the segment 17.

The hub 25 of segment 17 is perforated to receive a journal bar or bolt 26 which also passes through perforations in the ends of the projections 27 and 28 projecting from the rear face or base of the head rest 22. A nut 30 serves to lock the journal bar 26 against displacement. The head-rest usually comprises an upholstered or cushioned forward face to receive the head of an occupant of the chair, and a rigid base or rear face to which the projections 27 and 28 are rigidly attached. The projections 27 and 28 serve to journal the head-rest upon and relative to the shank 15 and segment 17. The head rest has an idle or inoperative position shown in full lines in Figs. 1 and 2, and a plurality of operative positions, depending upon which one of the recesses 18, 19, and 20 is engaged by the latch bar 21, one of which operative positions is shown in dotted line in Fig. 2.

As illustrated in Figs. 1, 2, 3, and 4 the rigid frame or base of the head rest comprises two end sections 32 and 33 connected together by means of two cross bars 34 and 35 to which they are rigidly attached by screws or rivets 36. The latch bar 21 is seated at one end in a perforation 37 in the crossbar 34 and its opposite end is supported in a perforation 38 in the cross bar 35. A collar 39 mounted rigidly upon the latch bar 21 serves as a seat for one end of a coiled actuating spring 40, while the cross bar 35 serves as a seat for the opposite end of the spring 40. The opposite face of the collar 39 rests against one face of an actuating lever 41 which lever is preferably cast with an eye for the passage of the latch bar, and an eye 42 for the passage of one of the projections 43 from the cross bar 34, whereby the lever is in effect fulcrumed upon the cross-bar 34 adjacent to the projection 43 and retained against displacement by the projection 43. Lateral blades or projections 70 and 71 carried by the lever 41 engage opposite sides of the cross bar 34, see Fig. 4, to hold the lever 41 in alignment relative to the cross bar 34. The spring holds the latch bar 21 and lever 41 normally in the position shown in Fig. 3. The end of lever 41 projects through one of the perforations 45 in the end plates 32 and 33 to enable the operator to grasp the projecting end of lever 41 with his thumb or finger while he grasps the rear or rigid face of the head-rest with his remaining fingers and thus by compression actuates the lever 41 causing the latch bar 21 to be retracted against the resilient action of the spring 40, to release the head-rest from engagement with the segment 17, and to enable the head-rest to be readjusted to a new operative position or to an idle position, using one hand only, before pressure on the free end of lever 41 is released. Where it is desired to shift the head-rest from idle to an operative position the head-rest may be grasped by one hand only at any point thereon and moved to an operative position, whereupon the cam face 24 of the segment 17 will engage the free inner end of the latch bar 21, and counteract the effect of the spring 40 so as to permit the latch bar to ride over the face of the cam 24 until it is able to enter the recess 18 and lock the head-rest in operative position. In order to shift the head-rest so that the latch bar will engage one of the recesses 19, and 20, the operator presses upon the free end of lever 41 as heretofore described to retract the latch bar and then with one hand and at one operation with the release of the latch bar shifts the head-rest to the desired new position of adjustment and then releases the head-rest and lever 41. In practice a facing material is stretched over the edges of the end sections 32 and 33, and upholstering material 46 forced in against the rear face of the facing material 47 either with or without the use of upholstering springs as may be desired. The lever 41 is adapted to be mounted upon either one of the projections 43, to adapt the head-rest without other change to be used either right hand or left hand as may be desired.

In the modification Figs. 5 and 6 the head-rest comprises a rigid back 50, as for instance a block of wood over which is drawn a facing material 51 of leather for instance with an upholstering or cushioning material 52 confined by the facing material over the front face of the back 50. The back 50 is centrally recessed or perforated and has attached thereto to close said recess a cast metal member 54 held by screws 55 to the back 50. The member 54 is provided with projections 56 and 57 corresponding to the members 27 and 28 of Figs. 1 and 2, by means of which the head-rest is journaled by a bolt 26 to the segment 17 and shank 15. A latch bar 58 corresponding to the latch bar 21 of Figs. 1, 2, and 3, is mounted near one end in a perforation through the member 54 and near its opposite end is mounted in a perforation through a yoke member 59 detachably attached by screws 60 to the member 54. A spring 61 is seated at one end against the yoke 59, and at its opposite end against the collar 62 of the latch bar 58. An actuating lever 64 of flexible sheet metal is attached at one end by screws 63 to the metal member 54, with its free end projecting in rear of the head rest member 50 at one side thereof. The latch bar 58 passes through a perforation in the actuating lever 64, and the collar 62 rests against one face of the lever 64, thereby enabling the operator by grasping the head-rest and free end of lever 64 and pressing them together to retract the latch bar 58 from engagement with the segment 17. The shank segment, and cam of Figs. 5 and 6 are the same as shown and described for Figs. 1, 2, and 3. The form of head rest shown in Figs. 1, 2, and 3 is a more elaborate and expensive type than that shown in Figs. 5 and 6, and aside from its first cost is preferable. The operation is substantially the same in both types, and may be conveniently carried out using one hand only, which is of practical importance since a barber usually has one or more implements of his trade in one hand, and only the other hand available to adjust the head-rest. The latch retracting apparatus Figs. 5 and 6 is adjustable to right or left handed positions by unfastening the member 54 from the back 50, and reversing the position of member 54 relative to the back 50, and then replacing the fastening screws 55.

The apparatus herein shown and described is capable of considerable modification within the scope of the claims without departing from the spirit of my invention.

What I claim is:

1. A headrest comprising a frame, a shank pivotally supporting the same and adapted to be mounted upon a chair back, said shank presenting a segment adjacent said pivotal connection and having an apertured cam surface, a spring-pressed latch bar slidably mounted in said frame and adapted to register with a selected aperture in said cam surface for locking said head rest in an operative position, studs carried by said frame and located upon opposite sides of said latch bar and adapted to serve selectively to pivotally confine a latch bar actuating lever, and an actuating lever in engagement at one end with said latch bar and having a perforation to receive and engage one or other of said studs to loosely and pivotally connect said actuating lever in right-handed or left-handed relation to said frame and latch bar, the inner end of said latch bar being out of contact with said cam surface when the head rest is in idle position and adapted to contact with and ride over said cam surface to retract said bar for subsequent registration with an aperture when said head rest is rotated from idle to operative position.

2. A head rest, comprising a frame embodying a pair of cross-bars removably secured together and held in spaced relation by projections therebetween, a shank pivotally supporting said head rest and adapted to connect the same with a chair back, said shank presenting a segment disposed adjacent the pivotal connection and having an apertured cam surface, a spring-pressed latch bar slidably mounted between said cross-bars and adapted to register with a selected aperture in said cam surface to lock said head rest in operative position and an actuating lever having a rocking movement and fulcrumed around one of said projections, the inner end of said lever being operatively connected to said latch bar for releasing the same upon manipulation of the projecting free end of said lever.

In testimony whereof I have affixed by signature.

FRANK KOENIGKRAMER.